C. P. McWANE.
TIRE PROTECTOR.
APPLICATION FILED JUNE 15, 1920.

1,406,202.  Patented Feb. 14, 1922.

Inventor,
C. P. McWane.
By C. A. Snow & Co.
Attorneys

UNITED STATES PATENT OFFICE.

CHARLES P. McWANE, OF BIRMINGHAM, ALABAMA.

TIRE PROTECTOR.

1,406,202.  Specification of Letters Patent.  Patented Feb. 14, 1922.

Application filed June 15, 1920.  Serial No. 389,112.

*To all whom it may concern:*

Be it known that I, CHARLES P. McWANE, a citizen of the United States, residing at Birmingham, in the county of Jefferson and State of Alabama, have invented a new and useful Tire Protector, of which the following is a specification.

It is the object of this invention to provide a device, which, being mounted upon a vehicle wheel, will protect a tire from puncture and other injuries, novel means being provided whereby the protector may be mounted readily on a wheel and the construction being such that the resiliency of the pneumatic tire will not be impaired.

It is within the province of the disclosure to improve generally and to enhance the utility of devices of that type to which the invention appertains.

With the above and other objects in view which will appear as the description proceeds, the invention resides in the arrangement and combination of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
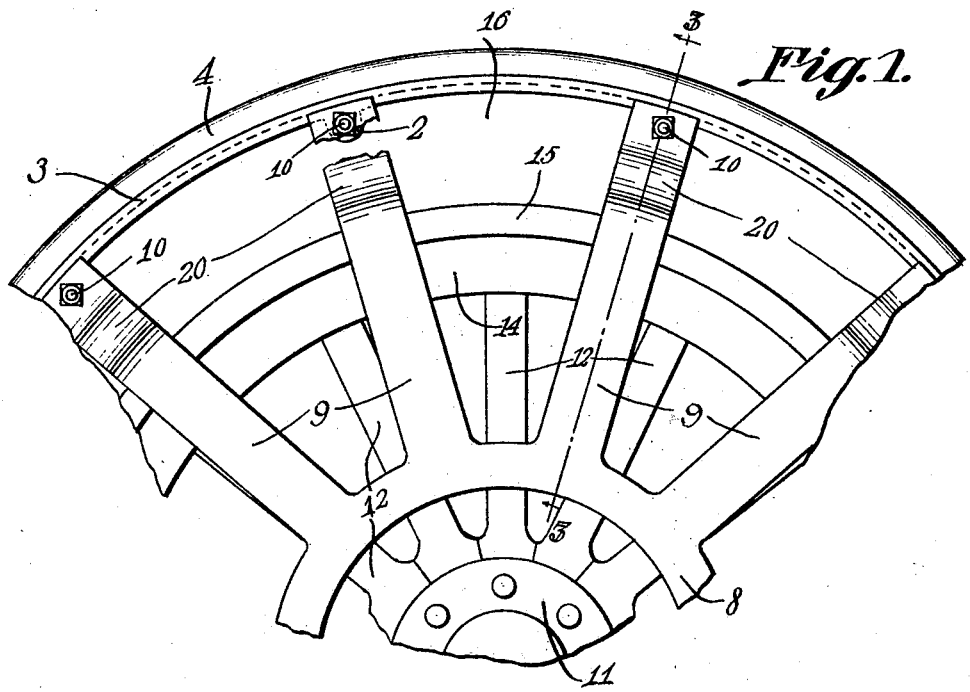
Figure 2:
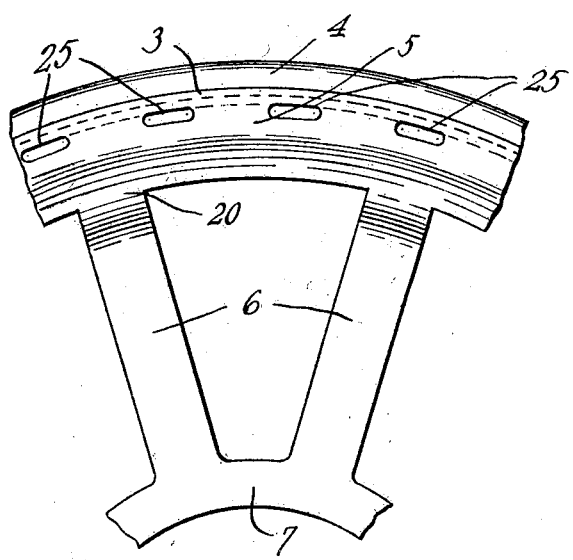
Figure 3:
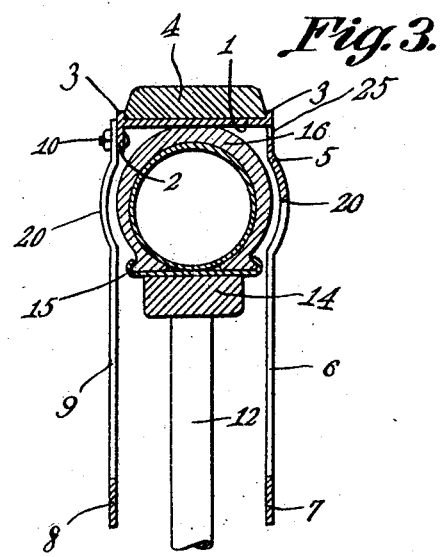

Figure 1 shows in side elevation, a portion of a device constructed in accordance with the invention, parts being broken away; Figure 2 is a fragmental elevation wherein the opposite side of the structure from that delineated in Figure 1 is disclosed; and Figure 3 is a section taken approximately on the line 3—3 of Figure 1.

Saving as hereinafter alluded to, the device forming the subject matter preferably is made of metal throughout and includes a tread member which is a composite structure. The tread member comprises an annular base 1 which, in cross section, is straight, as shown in Figure 3, and is not curved to conform to the transverse curvature of the tire 16, hereinafter alluded to. The base 1 is supplied at one side with inwardly projecting ears 2. The base 1 has outwardly extended flanges 3 between which is located a tire 4. The tire 4 may be of any desired construction and may be fashioned from rubber or rubber compound if preferred. The base 1 is supplied with an inwardly extended continuous annular flange 5 from which projects spokes 6 formed integrally with a side ring 7. The construction is such that the base 1, the flange 5, the spokes 6 and the side ring 7 may be fashioned in one piece, and there is an advantage in providing the flange 5, since the union between the spokes 6 and a part such as the flange 5 will be stronger than would be the union if the spokes 6 were continuous and were formed integrally with the base 1.

The device includes a side ring 8 having spokes 9, the outer ends of the spokes being overlapped on the ears 2 of the base 1 and being united thereto detachably, by securing elements 10, such as bolts.

The numeral 11 denotes the hub of a vehicle wheel from which projects spokes 12 carrying a felly 14 a rim 15 whereon the tire 16, hereinbefore mentioned, is mounted.

In practical operation, the base 1 cooperates with the tread portion of the tire 16 and it is to be observed that the parts 6—5 and the spokes 9 are outwardly bowed, in opposite directions, as indicated at 20, adjacent to the tire 16, so that that portion of the tire which is adjacent to the bottom of the wheel may expand laterally under the weight of the vehicle. The rings 7 and 8, and cooperating parts are located on opposite sides of the vehicle wheel. The device may be mounted readily on the wheel and may with equal facility be removed therefrom, since the spokes 9 are connected to the ears 2 by the securing elements 10.

It will be obvious that when a vehicle wheel carries a structure of the kind hereinbefore described, punctures will be practically impossible, the tire 16 being shielded and protected from wear. The device is light in weight and will detract nothing from the appearance of the vehicle wheel on account of peculiarities in construction.

Openings 25 are formed in the flange 5, in flush relation to the base 1. The openings 25 have two functions. First, they permit dirt to find its way out of the protector, should the tire yield and bear against the bulged portion of the flange 5, shown in Figure 3. Secondly, since the base 1 and the flange 5 are integral, the openings facilitate the formation of the flange 5.

Having thus described the invention, what is claimed is:—

A tire protector comprising a one-piece structure including a base, an inwardly projecting continuous flange along one edge of the base, said flange having circumferentially spaced unencumbered openings which are flush with the base, the openings providing for the egress of dirt and facilitating the formation of said flange, spokes projecting from said flange, and a ring carried by the inner ends of the spokes; a second ring having projecting spokes; and means for connecting the spokes of the second ring to the other edge of the base, detachably.

In testimony that I claim the foregoing as my own, I have hereto affixed my signature in the presence of two witnesses.

CHARLES P. McWANE.

Witnesses:
JOHN J. MADDOX,
M. D. COPENHAUER.